3,299,143
METHOD OF MAKING PHOSPHONIUM SALTS
Martin Grayson, Norwalk, Patricia Tarpey Keough, Ridgefield, and Michael McKay Rauhut, Norwalk, Conn., assignors to American Cyanamid Company, Stamford, Conn., a corporation of Maine
No Drawing. Continuation of application Ser. No. 256,124, Feb. 4, 1963. This application Feb. 12, 1964, Ser. No. 344,224
2 Claims. (Cl. 260—606.5)

This application is a continuation of Ser. No. 256,124, now abandoned.

The present invention relates to organophosphorus compounds and to a method of preparing same. More particularly, the instant discovery concerns phosphonium salt derivatives of tertiary phosphines.

It has been found that tertiary phosphines generally will react with halo-substituted ethanol to produce the corresponding trialkyl-, tricycloalkyl-, or tri-aryl- 2-hydroxyethylphosphonium salts. In turn, these salts may be acylated using a lower alkanoic anhydride, lower alkanoic acid, or the like, to produce their corresponding trialkyl-, tricycloalkyl-, or triaryl-2-acetoxyethylphosphonium salts.

The following equations illustrate this general reaction:

(A) 

(B) 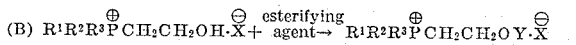

$R^1$, $R^2$, $R^3$ each representing, as will be seen hereinafter, alkyl, cycloalkyl and aryl, X representing halogen or tetraphenyl borate, and Y representing the residue of an acylating or esterifying agent. The following is a typical embodiment of generic Equations A and B, above:

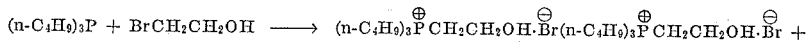 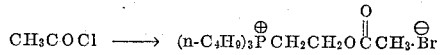

The trialkyl-, tricycloalkyl-, and triaryl- 2-acetoxyethylphosphonium salts prepared as above may, in turn, be converted to their corresponding vinylphosphonium salts according to the following general equation:

(C) 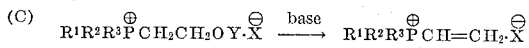

in which $R^1$, $R^2$, $R^3$, Y and X are the same as above.
The following is a typical embodiment of Equation C, above:

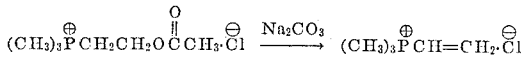

More specifically, in generic Equations A, B and C, above, $R^1$, $R^2$ and $R^3$ each represent alkyl $C_1$–$C_{16}$, substituted alkyl $C_1$–$C_{16}$, cycloalkyl, and aryl; X represents halogen, such as bromo, chloro and iodo, and tetraphenyl borate; and Y in Equations B and C represents the residue of an acylating agent as shown in the specific embodiments, supra.

Typical tertiary phosphine reactants are the following: trimethylphosphine, triethylphosphine, tripropylphosphine, tributylphosphine, tripentylphosphine, trihexylphosphine, triheptylphosphine, trioctylphosphine, trinonylphosphine, tridecylphosphine, triundecylphosphine, tridodecylphosphine, tritridecylphosphine, tritetradecylphosphine, tripentadecylphosphine, trihexadecylphosphine, dodecyldiethylphosphine, dioctylpropylphosphine, diethylbutylphosphine, butylethylhexylphosphine, tri(2-methoxypentyl)phosphine, tris-2-cyanoethylphosphine, diethyl-2-ethoxyheptylphosphine, tricyclopropylphosphine, tricyclohexylphosphine, triphenylphosphine, diphenylnaphthylphosphine, trixylylphosphine, tritolylphosphine, tris(para-ethoxyphenyl)phosphine, tris(para-chlorophenyl)phosphine, tris(2-chlorophenyl)phosphine, tris(3-bromophenyl)phosphine, and the like.

Typical esterifying agents follow: lower alkanoic anhydrides, such as acetic anhydride, propionic anhydride, butanoic anhydride; lower alkanoic acids, such as formic acid, acetic acid, propionic acid, butanoic acid; acylating ($C_2$–$C_{18}$ alkanoyl) halides, such as acetyl chloride, propionyl bromide, butyryl iodide, octanoyl chloride, dodecanoyl bromide, stearyl chloride, hexanoyl bromide; isopropenyl acetate; aryl sulfonyl halides, such as paratoluenesulfonyl chloride, phenyl sulfonyl bromide, 2,4-dimethylphenylsulfonyl chloride; alkyl (lower) chloroformates, such as ethylchloroformate, butylchloroformate; alkyl (lower) carbonates, such as diethylcarbonate, dipropylcarbonate, dibutylcarbonate; ketene; dimethyl sulfate; nitrosyl chloride; and trimethyl phosphate.

In Equation C, above, typical suitable inorganic and organic bases are: alkali metal hydroxides, such as sodium hydroxide, potassium hydroxide, lithium hydroxide; alkali metal carbonates, such as sodium carbonate, potassium carbonate, lithium carbonate; alkaline earth metal hydroxides, such as magnesium hydroxide, barium hydroxide, calcium hydroxide; alkaline earth metal carbonates, such as magnesium carbonate, barium carbonate, calcium carbonate; activated alumina; and quaternary ammonium hydroxides, such as tetraalkyl(lower)ammonium hydroxides, including tetramethylammonium hydroxide, tetrapropylammonium hydroxide, and tetrabenzylammonium hydroxide; and basic ion exchange resins.[1]

The reaction in Equation A hereinabove is carried out at a temperature in the range of 30° C. to 250° C., preferably 60° C. to 180° C. The Equation B reaction, above, is best carried out at a temperature in the range of 5° C. to 150° C. As to Equation C, above, this reaction is generally carried out at a temperature in the range of 20° C. to 180° C., preferably 50° C. to 150° C.

Each of these three reactions may be carried out at atmospheric, sub-atmospheric or super-atmospheric pressure; preferably, however, reaction is carried out at atmospheric pressure. By the same token, the ratio of the reactants in each of Equations A, B and C is not critical, an excess of either reactant, in each equation, with respect to the other being suitable. In Equation B, however, an excess of about 10% by weight of the acylating agent relative to the phosphonium salt reactant is preferred. Generally in Equations A and C stoichiometric amounts of the reactants are employed.

---
[1] Typical are: polymeric quaternary ammonium salts, e.g., polymeric trimethylbenzyl ammonium chloride, etc.

The reactions of Equation A, above, are best carried out in the presence of an inert organic solvent, i.e., a solvent which does not enter into or otherwise interfere with the reaction under the conditions contemplated herein. Typical solvents are dimethoxyethane, dioxane, ethylacetate, tetrahydrofuran, and the like.

The reactions of Equation B similarly are best carried out in the presence of an inert organic solvent of the type described for Equation A, as well as acetic acid, dimethylformamide, diglyme, and the like.

As to Equation C, typical suitable inert organic solvents in which the phosphonium salt is solvent, which solvents do not interfere or enter into reaction to any substantial degree, are dimethoxyethane, dioxane, dimethylformamide, diglyme, acetonitrile, ethylacetate, tetrahydrofuran, and other like linear and cyclic ethers, acetate esters (lower alkyl).

Alternatively, it has been found pursuant to the instant discovery that the products of Equation A, above, may be converted directly to the products of Equation C, thusly, D

in the presence of any base given above for Equation C and at a temperature in the range of 100° C. to 250° C. As in Equation C, a solvent of the type given hereinabove for Equation C is suitable and herein contemplated. If desired, the reaction may be carried out in the presence of a dehydrating agent, such as a siliceous agent including silica (e.g. silica gel), silica-alumina, and the like, in which other inert organic solvents are also suitable, e.g. aromatic hydrocarbons, such as toluene, benzene, xylene, cymene, and the like, methylene chloride, ethylene chloride, etc.

The products of Equations A, B, C and D above are useful as fire retardants in plastics, e.g., from 0.5 to 30 parts by weight of any one of above compounds when incorporated into 100 parts by weight of a thermoplastic polymer material, such as polyethylene, polypropylene, polystyrene, polyacrylate, polymethylmethacrylate, or the like, provides enhanced fire retardance to the polymer material upon exposure to an open flame.

While the following examples specify certain details as to certain embodiments of the present invention, it is not intended that these details impose unnecessary limitations upon the scope of the instant discovery, excepting of course that these limitations appear in the appended claims.

*Example I.—Tributyl-2-hydroxyethylphosphonium tetraphenylborate*

Tributyl - 2 - hydroxyethylphosphonium bromide, obtained from combining tributylphosphine and 2-bromoethanol in 1,2-dimethoxyethane and refluxing under nitrogen, is dissolved in water and treated with excess 0.1 N sodium tetraphenylboron. The resulting precipitate is filtered and recrystallized from ethanol to yield product tributyl - 2 - hydroxyethylphosphonium tetraphenylborate with melting point 124° C.–125° C.

Analysis of product—Found: C, 80.03; H, 9.00; P, 5.35. $C_{38}H_{52}O$ requires: C, 80.55; H, 9.25; P, 5.47%.

As is evident from this example, the halide salts of Equation A may be converted, in situ or after recovery thereof, to the corresponding tetraphenylborate salts.

*Example II.—Tributyl-2-acetoxyethylphosphonium bromide*

1,2-dimethoxyethane (275 milliliters), freshly distilled from calcium hydride, 2-bromoethanol (133 grams, 1.06 moles), and tributylphosphine (204 grams, 1.01 moles) are combined under nitrogen and refluxed at 85° C. overnight with stirring. A heavy oil forms within an hour. Isopropenyl acetate (320 grams, 3.2 moles) and 48% HBr (3 drops) are slowly added to the reaction mixture which is then refluxed 18 hours. Volatile components are removed in vacuo at 70° C. Product (372.5 grams; 99.9% yield) remains as a thick hygroscopic oil, which could be forced to crystallize by stirring in a benzene-petroleum ether (boiling point 30° C.–60° C.) mixture. Crystalline tributyl-2-acetoxyethylphosphonium salt is obtained from part of the oily product by freeze drying a benzene solution of the oil.

*Example III.—Tributyl-2-acetoxyethylphosphonium tetraphenylborate*

Tributyl-2-acetoxyethylphosphonium bromide oil (16.2 grams produced as in Example II, above) is dissolved in water and treated with sodium tetraphenylboron (15 grams) dissolved in water. A white precipitate appears which is filtered and recrystallized from ethanol containing enough acetonitrile to cause solution at the boiling point of the mixture. Tributyl-2-acetoxyethylphosphonium tetraphenylborate (16.7 grams) is obtained with melting point of 177° C.–179° C.

Analysis of product—Found: C, 76.65; H, 8.83; P, 5.24. $C_{40}H_{54}O_2BP$ requires: C, 78.93; H, 8.94; P, 5.10%.

*Example IV.—Triphenyl-2-acetoxyethylphosphonium iodide*

2-iodoethyl acetate is prepared from the nucleophilic exchange reaction of sodium iodide and 2-chloroethylacetate in refluxing acetone under nitrogen (boiling point 86° C.–90° C. at 33 milliliters mercury). Triphenylphosphine (7.35 grams) is reacted with 2-iodoethylacetate (24 grams) under nitrogen with stirring at 80° C. for 4.5 hours. The excess 2-iodoethylacetate is distilled off in vacuo. Crude, brown crystalline product (14.20 grams) is obtained by washing oily residue with ether. It is washed with ether, ethylacetate, and acetone and recrystallized from acetonitrile to give product (7.90 grams) with melting point 161° C.–163° C.

Analysis of product—Found: C, 55.16; H, 4.80; I, 26.77; P, 6.45. $C_{22}H_{22}O_2IP$ requires: C, 55.47; H, 4.66; I, 26.66; P, 6.51%.

Example IV represents still another embodiment of the present invention wherein the product salts of Equation B, above, are prepared directly from the reaction of a 2-haloethyl acetate with a tertiary phosphine of the type contemplated herein.

The process of Example IV, above, may be carried out using any of the tertiary phosphine reactants contemplated herein and the corresponding tri-substituted-2-acetoxyethylphosphonium halide produced and recovered, according to the following equation

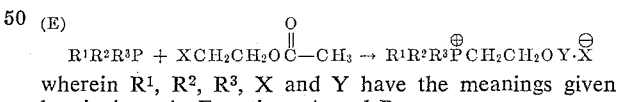

wherein $R^1$, $R^2$, $R^3$, X and Y have the meanings given hereinabove in Equations A and B.

Equation E is best carried out at a temperature in the range of 5° C. to 150° C., preferably at the reflux temperature of the solvent employed. Typical inert organic solvents contemplated for Equation E are acetone, lower alkanol (ethanol, butanol), plus the solvents listed hereinabove for Equation C. The reaction under Equation E, as shown in Example IV, supra, is best carried out under inert conditions, such as nitrogen. Other 2-haloethyl acetate reactants contemplated herein are 2-bromoethyl acetate and 2-chloroethyl acetate.

Tables A, B, C, D and E, which follow, correspond to Equations A, B, C, D and E, respectively. The examples in Tables A and B are carried out essentially as in Examples I and II, respectively, supra, excepting of course as shown in Tables A and B. The examples in Table C are carried out essentially as in Example LX, infra, excepting of course as shown in Table C. Likewise, the products of Table D are recovered essentially as in Example LX, infra. The examples in Table E are carried out essentially as in Example IV, supra, excepting of course as shown in Table E.

TABLE A $$R^1R^2R^3P + XCH_2CH_2OH \longrightarrow R^1R^2R^3\overset{\oplus}{P}CH_2CH_2OH \cdot \overset{\ominus}{X}$$

| Ex. No. | R¹ | R² | R³ | Moles R¹R²R³P | X | Moles XCH₂CH₂OH | Solvent | Milliliters of Solvent | Temp. °C. | Product |
|---|---|---|---|---|---|---|---|---|---|---|
| V | CH₃ | CH₃ | CH₃ | 1 | Br | 1.0 | DME [1] | 1,500 | 70 | 2-hydroxyethyltrimethylphosphonium bromide. |
| VI | n-C₄H₉ | n-C₄H₉ | n-C₄H₉ | 1 | Cl | 1.0 | DME | 1,500 | 83 | 2-hydroxyethyltributylphosphonium chloride. |
| VII | n-C₄H₉ | n-C₄H₉ | n-C₄H₉ | 1 | Cl | 1.2 | Dioxane | 1,200 | 101 | 2-hydroxyethyltributylphosphonium chloride. |
| VIII | n-C₄H₉ | n-C₄H₉ | n-C₄H₉ | 1 | I | 1.2 | Dioxane | 2,000 | 101 | 2-hydroxyethyltributylphosphonium iodide. |
| IX | i-C₄H₉ | i-C₄H₉ | i-C₄H₉ | 1 | Cl | 0.9 | Ethyl Acetate. | 1,800 | 50 | 2-hydroxyethyltriisobutylphosphonium chloride. |
| X | n-C₈H₁₇ | n-C₈H₁₇ | n-C₈H₁₇ | 1 | Cl | 1.1 | DME | 1,700 | 83 | 2-hydroxyethyltrioctylphosphonium chloride. |
| XI | n-C₁₂H₂₅ | n-C₁₂H₂₅ | n-C₁₂H₂₅ | 1 | Cl | 1.1 | DME | 1,700 | 83 | 2-hydroxyethyltridodecylphosphonium chloride. |
| XII | C₁₆H₃₃ | C₁₆H₃₃ | C₁₆H₃₃ | 1 | Cl | 1.3 | THF [2] | 1,600 | 30 | 2-hydroxyethyltrihexadecylphosphonium chloride. |
| XIII | C₂H₅ | C₂H₅ | C₂H₅ | 1 | Cl | 1.0 | Dioxane | 1,700 | 200 | 2-hydroxyethyltriethylphosphonium chloride. |
| XIV | C₄H₉ | C₂H₅ | C₆H₁₃ | 1 | Cl | 1.1 | Ethyl Acetate. | 2,000 | 45 | 2-hydroxyethylbutylethylhexylphosphonium chloride. |
| XV | C₂H₅ | C₂H₅ | C₂H₅O—CH₂—CH₂ | 1 | Cl | 1.2 | Dioxane | 1,800 | 75 | 2-hydroxyethyldiethyl-2-ethoxyethylphosphonium chloride. |
| XVI | cyclohexyl | cyclohexyl | cyclohexyl | 1 | Br | 1.3 | DME | 1,600 | 60 | 2-hydroxyethyltricyclohexylphosphonium bromide. |
| XVII | cyclopentyl | cyclopentyl | cyclopentyl | 1 | Cl | 0.9 | DME | 2,000 | 80 | 2-hydroxyethyltricyclopentylphosphonium chloride. |
| XVIII | naphthyl | phenyl | phenyl | 1 | I | 1.1 | Dioxane | 1,500 | 90 | 2-hydroxyethyldiphenylnaphthylphosphonium iodide. |
| XIX | phenyl | phenyl | phenyl | 1 | I | 1.0 | Dioxane | 2,000 | 101 | 2-hydroxyethyltriphenylphosphonium iodide. |
| XX | p-Cl-C₆H₄ | p-Cl-C₆H₄ | p-Cl-C₆H₄ | 1 | Cl | 1.2 | Ethyl Acetate. | 1,600 | 65 | 2-hydroxyethyltri(para-chlorophenyl)phosphonium chloride. |
| XXI | p-CH₃-C₆H₄ | p-CH₃-C₆H₄ | p-CH₃-C₆H₄ | 1 | Cl | 1.3 | DME | 1,700 | 83 | 2-hydroxyethyltri(para-tolyl)phosphonium chloride. |

[1] DME = dimethoxyethane.
[2] THF = tetrahydrofuran.

TABLE B $$R^1R^2R^3\overset{\oplus}{P}CH_2CH_2OH \cdot \overset{\ominus}{X} + A \longrightarrow R^1R^2R^3\overset{\oplus}{P}CH_2CH_2OY \cdot \overset{\ominus}{X}$$

| Example No. | Product of Example No. | Moles $R_3\overset{\oplus}{P}CH_2CH_2OH \cdot \overset{\ominus}{X}$ | A | Moles A | Solvent Milliliters (ml.) | Temp. °C. | Product |
|---|---|---|---|---|---|---|---|
| XXII | V | 1.0 | Isopropenyl Acetate | 3.2 | DME, 300 ml | 83 | 2-acetoxyethyltrimethyl phosphonium bromide. |
| XXIII | VI | 1.0 | Dimethyl Sulfate | 3.8 | Dioxane, 300 ml. | 90 | 2-methylsulfatoethyltributyl phosphonium chloride. |
| XXIV | VII | 0.8 | Acetic Anhydride | 1.0 | Acetic acid, 300 ml. | 120 | 2-acetoxyethyltributyl phosphonium chloride. |
| XXV | VIII | 0.9 | Nitrosyl Chloride | 1.1 | Diglyme | 120 | 2-nitroethyltributyl phosphonium iodide. |
| XXVI | IX | 1.0 | Acetyl Chloride | 1.2 | DME, 500 ml | 30 | 2-acetoxyethyltriisobutyl phosphonium chloride. |
| XXVII | XI | 1.0 | p-Toluenesulfonyl chloride. | 1.0 | DME, 200 ml | 60 | 2-(p-toluenesulfonyloxy)-ethyltridodecylphosphonium chloride. |
| XXVIII | XIII | 1.0 | Trimethyl Phosphate | 1.1 | Acetic Acid, 500 ml. | 80 | 2-dimethylphosphatoethyltriethyl phosphonium chloride. |
| XXIX | XII | 1.0 | Propionic Acid | 2.4 | DMF,¹ 300 ml | 10 | 2-propionyloxyethyltrihexadecyl-phosphonium chloride. |
| XXX | XIV | 1.0 | Butanoic Anhydride | 1.0 | DMF, 1,000 ml. | 30 | 2-butyryloxyethylbutylethylhexyl-phosphonium chloride. |
| XXXI | XV | 0.8 | Acetic Acid | 4.0 | None | 118 | 2-acetoxyethyldiethyl-2-ethoxyethyl-phosphonium chloride. |
| XXXII | XVI | 0.9 | Acetyl Chloride | 1.0 | DME, 200 ml | 65 | 2-acetoxyethyltricyclohexylphosphonium bromide. |
| XXXIII | XVII | 1.0 | Hexanoyl Chloride | 1.9 | Dioxane, 150 ml. | 25 | 2-hexanoyloxyethyltricyclopentyl-phosphonium chloride. |
| XXXIV | XIX | 1.0 | Acetic Anhydride | 6.0 | None | 100 | 2-acetoxyethyltriphenyl phosphonium iodide. |
| XXXV | XVIII | 1.1 | Stearyl Chloride | 3.3 | DME, 700 ml. | 50 | 2-stearyloxyethyldiphenylnaphthyl-phosphonium iodide. |
| XXXVI | XX | 1.0 | Dodecanoyl Bromide. | 4.0 | DMF, 1,000 ml. | 40 | 2-dodecanoyloxyethyltri(para-chlorophenyl)phosphonium chloride. |
| XXXVII | XXI | 1.0 | Phenylsulfonyl Bromide. | 1.0 | Dioxane, 600 ml. | 65 | 2-(phenylsulfonyloxy)ethyl-tri-(paratolyl)phosphonium chloride. |
| XXXVIII | V | 1.0 | Ethylchloroformate | 2.0 | Diglyme, 300 ml. | 40 | 2-(ethoxycarbonyloxy)ethyltrimethyl phosphonium bromide. |
| XXXIX | VII | 0.9 | Dipropyl carbonate | 3.0 | DME, 250 ml | 100 | 2-(propoxycarbonyloxy)ethyl-tributylphosphonium chloride. |
| XL | VII | 1.0 | Ketene | 1.0 | THF, 500 ml | 75 | 2-acetoxyethyltributyl phosphonium chloride. |

¹ DMF=dimethylformamide.

TABLE C $$R^1R^2R^3\overset{\oplus}{P}CH_2CH_2OY \cdot \overset{\ominus}{X} + Base \longrightarrow R^1R^2R^3\overset{\oplus}{P}CH=CH_2 \cdot \overset{\ominus}{X}$$

| Example No. | Product of Example No. | Moles of $R^1R^2R^3\overset{\oplus}{P}CH_2CH_2OY \cdot \overset{\ominus}{X}$ | Base | Moles of Base | Solvent ¹ Milliliters (ml.) | Temp. °C. | Product |
|---|---|---|---|---|---|---|---|
| XLI | XXII | 1.0 | K₂CO₃ | 1.0 | DME, 300 ml | 83 | Vinyltrimethylphosphonium bromide. |
| XLII | XXIII | 1.0 | Na₂CO₃ | 2.0 | Dioxane, 300 ml. | 100 | Vinyltributylphosphonium chloride. |
| XLIII | XXIV | 1.0 | Li₂CO₃ | 4.0 | Ethyl acetate, 500 ml. | 80 | Vinyltributylphosphonium chloride. |
| XLIV | XXV | 2.0 | Mg(CO₃) | 8.0 | Diglyme | 100 | Vinyltributylphosphonium iodide. |
| XLV | XXVI | 0.5 | Ba(OH)₂ | 1.0 | Acetonitrile, 500 ml. | 80 | Vinyltriisobutylphosphonium chloride. |
| XLVI | XXVII | 0.9 | Ca(OH)₂ | 1.1 | THF, 600 ml | 60 | Vinyltridodecylphosphonium chloride. |
| XLVII | XXVIII | 1.0 | Polymeric trimethyl-benzyl ammonium chloride. | 4.0 | DME, 400 ml | 85 | Vinyltriethylphosphonium chloride. |
| XLVIII | XXIX | 1.0 | KOH | 1.0 | THF | 150 | Vinyltrihexadecylphosphonium chloride |
| XLIX | XXX | 1.0 | NaOH | 1.0 | Acetonitrile | 20 | Vinylbutylethylhexylphosphonium chloride. |
| L | XXXI | 1.0 | LiOH | 1.0 | Acetonitrile | 60 | Vinyldiethyl-2-ethoxy-ethyl-phosphonium chloride. |
| LI | XXXII | 1.0 | Mg(OH)₂ | 3.0 | THF | 72 | Vinyltricyclohexylphosphonium bromide. |
| LII | XXXIII | 2.0 | Ca(CO₃) | 1.0 | Dioxane | 180 | Vinyltricyclopentylphosphonium chloride. |
| LIII | XXXIV | 0.5 | Ba(CO₃) | 1.0 | DME | 81 | Vinyltriphenylphosphonium iodide. |
| LIV | XXXV | 3.0 | Polymeric triethyl-benzyl ammonium hydroxide. | 1.0 | Dioxane | 97 | Vinyldiphenylnaphthylphosphonium iodide. |
| LV | XXXVI | 1.0 | Polymeric triethyl-benzyl ammonium hydroxide. | 5.0 | DME | 50 | Vinyltri(para-chlorophenyl)phosphonium chloride. |
| LVI | XXXVII | 1.0 | Activated alumina | 1.0 | THF | 35 | Vinyltri(para-tolyl)phosphonium chloride. |
| LVII | XXXVIII | 1.0 | Tetramethylammonium hydroxide. | 1.7 | Diglyme | 42 | Vinyltrimethylphosphonium bromide. |
| LVIII | XXXIX | 2.0 | Tetrapropylammonium hydroxide. | 1.0 | DMF | 37 | Vinyltributylphosphonium chloride. |
| LIX | XL | 1.0 | Tetrabenzylammonium hydroxide. | 1.0 | DME | 25 | Vinyltributylphosphonium chloride. |

¹ When not specified the amount of solvent employed is 500 milliliters.

TABLE D $$R^1R^2R^3\overset{\oplus}{P}CH_2CH_2OH \cdot \overset{\ominus}{X} \xrightarrow[100°C.-250°C.]{\text{base}} R^1R^2R^3\overset{\oplus}{P}CH=CH_2 \cdot \overset{\ominus}{X}$$

| Example No. | Product of Example No. | Base | Temp °C. | Dehydrating Agent | 500 Milliliters of Solvent | Product |
|---|---|---|---|---|---|---|
| 1 | VI | Na₂CO₃ | 120 | Silica gel¹ | DME | Vinyltributylphosphonium chloride. |
| 2 | XI | Ca(OH)₂ | 100 | Silica-alumina¹ | DME | Vinyltridodecylphosphonium chloride. |
| 3 | XII | Li₂CO₃ | 220 | | THF | Vinyltrihexadecylphosphonium chloride. |
| 4 | XV | LiOH | 180 | Silica-alumina¹ | Dioxane | Vinyldiethyl-2-ethoxyethylphosphonium chloride. |
| 5 | XVI | Mg(OH)₂ | 150 | Silica gel¹ | DME | Vinyltricyclohexylphosphonium bromide. |
| 6 | XVIII | Na₂CO₃ | 250 | | Dioxane | Vinyldiphenylnaphthylphosphonium iodide. |
| 7 | XIX | BaCO₃ | 205 | | Dioxane | Vinyltriphenylphosphonium iodide. |
| 8 | XX | Na₂CO₃ | 200 | | DME | Vinyltri(para-chlorophenyl)-phosphonium chloride. |
| 9 | XXI | Activated alumina | 175 | | DME | Vinyltri(para-tolyl)phosphonium chloride. |

¹ Finely-divided particulates.

TABLE E

| Example No. | R¹R²R³P+ | $XCH_2CH_2O\overset{O}{\overset{\|}{C}}-CH_3$ | Temp. °C. | Solvent | Product |
|---|---|---|---|---|---|
| 10 | Tridodecylphosphine | X=Br | Reflux | Ethanol | Tridodecyl-2-acetoxy-ethylphosphonium bromide. |
| 11 | Tricyclohexylphosphine | X=I | 85 | Acetonitrile | Tricyclohexyl-2-acetoxy-ethylphosphonium iodide. |
| 12 | Tris(2-chlorophenyl)-phosphine | X=Cl | Reflux | Acetone | Tris(2-chlorophenyl)-2-acetoxyethylphosphonium chloride. |
| 13 | Tri(2-methoxypentyl)-phosphine | X=I | 50 | Dioxane | 2-acetoxyethylphosphonium iodide. |

By finely-divided particulates in Table D is intended 28 to 200 mesh. Larger or smaller particulates are likewise within the purview of the instant discovery.

*Example LX.—Tributylvinylphosphonium bromide*

Tributyl-2-acetoxyethylphosphonium bromide (23.7 millimoles) is dissolved in 1,2-dimethoxyethane (25 milliliters) and sodium carbonate (5.0 grams, 47 millimoles) is added. The mixture is stirred at reflux under nitrogen for 8 hours. The solid is filtered off and washed with hot 1,2-dimethoxyethane. The combined filtrates are evaporated to leave a semi-solid residue. Recrystallization from ethyl acetate yields product tributylvinylphosphonium bromide (3.3 grams, 10.7 millimoles, 45% yield with melting point 148° C.–150° C.). Further recrystallization from ethylacetate-acetonitrile raises the melting point to 151.5° C. to 152.5° C.

Pursuant to the present discovery, the products of Tables B, C, D and E, hereinabove, may be converted to their corresponding sulfur-containing derivatives by reaction with sulfhydryl (e.g., an alkyl mercaptan, an alkane dithiol, a benzenethiol, a dialkylphosphorodithioate, an O,O-dialkylphosphorodithiolate, and the like) at a temperature in the range 20° C. to 200° C. Table F, G, H which follows illustrates this reaction, the examples in said table being carried out essentially as in Example LXXVI, infra, excepting of course as specified in the table:

TABLE F, G, H

| | Reactants | | Products |
|---|---|---|---|
| (F) | $R^1R^2R^3PCH=CH_2 \overset{\oplus}{} \overset{\ominus}{X} + R(SH)_n$ | base | $[R^1R^2R^3PCH_2CH_2S]_nR \cdot \overset{\oplus}{} \overset{\ominus}{X}$ |
| | $R^2R^3PCH_2CH_2OY \cdot \overset{\oplus}{} \overset{\ominus}{X} + R(SH)_n$ | | |
| (G) | $R^1R^2R^3PCH=CH_2 \overset{\oplus}{} \overset{\ominus}{X} + \underset{A'}{\overset{A}{\underset{\|}{\overset{\|}{P}}}}SH$ | base | $\left[R^1R^2R^3PCH_2CH_2S\underset{A'}{\overset{A}{\underset{\|}{\overset{S\|}{P}}}}\right] \overset{\oplus}{} \overset{\ominus}{X}$ |
| | $R^1R^2R^3PCH_2CH_2OY \cdot \overset{\oplus}{} \overset{\ominus}{X} + \underset{A'}{\overset{A}{\underset{\|}{\overset{S\|}{P}}}}SH$ | | |
| (H) | $R^1R^2R^3PCH=CH_2 \overset{\oplus}{} \overset{\ominus}{X} + \underset{Q}{\overset{Z}{\underset{\|}{C}}}\underset{Q'}{\overset{N}{\underset{\|}{C}}}-SH$ | base | $\left[R^1R^2R^3PCH_2CH_2S-\underset{Q}{\overset{Z}{\underset{\|}{C}}}\underset{Q'}{\overset{N}{\underset{\|}{C}}}\right] \overset{\oplus}{} \overset{\ominus}{X}$ |
| | $R^1R^2R^3PCH_2CH_2OY \cdot \overset{\oplus}{} \overset{\ominus}{X} + \underset{Q}{\overset{Z}{\underset{\|}{C}}}\underset{Q'}{\overset{N}{\underset{\|}{C}}}-SH$ | | |

| Example No. | (1) Product of Example No. | Moles of (1) | (2) Sulfhydryl | Moles of (2) | Base | 500 Milliliters of Solvent | Temp., °C. | Products |
|---|---|---|---|---|---|---|---|---|
| LXI | XLI | 1.0 | $CH_3SH$ | 1.0 | | Dioxane | 22 | $[(CH_3)_3PCH_2CH_2SCH_3]^{\oplus} Br^{\ominus}$ |
| LXII | XXIX | 1.0 | $CH_3(CH_2)_3CH_2SH$ | 1.5 | NaOH | THF | 35 | $[(C_{16}H_{37})_3PCH_2CH_2SCH(CH_2)_3CH_3]^{\oplus} Cl^{\ominus}$ |
| LXIII | XLVII | 1.5 | $(CH_3)_3SiCH_2SH$ | 1.0 | | DME | 60 | $[(C_2H_5)_3PCH_2CH_2SCH_2Si(CH_3)_3]^{\oplus} Cl^{\ominus}$ |
| LXIV | XXV | 1.0 | $(C_6H_{13})_3SiCH_2SH$ | 1.0 | LiOH | DMF | 70 | $[(C_4H_9)_3PCH_2CH_2SCH_2Si(C_6H_{13})_3]^{\oplus} I^{\ominus}$ |
| LXV | XLIX | 2.0 | $HSCH_2CH_2SH$ | 1.0 | $Na_2CO_3$ | THF | 50 | $[(C_2H_5)(C_4H_9)(C_6H_{13})PCH_2CH_2SCH_2CH_2SCH_2CH_2P(C_6H_{13})(C_4H_9)(C_2H_5)]^{\oplus}2Cl^{\ominus}$ |
| LXVI | XXXI | 2.0 | $HSCH_2(CH_2)_{10}CH_2SH$ | 1.0 | KOH | Ethyl acetate | 31 | $[(C_2H_5)_2(CH_2CH_2)PCH_2CH_2SCH_2(CH_2)_{10}CH_2SCH_2CH_2P(CH_2CH_2)(C_2H_5)_2]^{\oplus}2Cl^{\ominus}$ |
| | | | | | | | | $\underset{OC_2H_5}{}$ $\underset{OC_2H_5}{}$ |

TABLE F, G, H—Continued

| Example No. | (1) Product of Example No. | Moles of (1) | (2) Sulfhydryl | Moles of (2) | Base | 500 Milliliters of Solvent | Temp., °C. | Products |
|---|---|---|---|---|---|---|---|---|
| LXVII | XXXIII | 1.0 | C₆H₅-CH₂SH | 2.0 | Ca(OH)₂ | THF | 200 | [(C₆H₅)₃PCH₂CH₂SCH₂-C₆H₅]⁺ Cl⁻ |
| LXVIII | LIII | 1.0 | C₁₀H₇-SH | 3.0 | Na₂CO₃ | Dioxane | 130 | [(naphthyl)-PCH₂CH₂S-C₁₀H₇]⁺ I⁻ |
| LXIX | XXV | 1.2 | C₆H₅-SH | 1.0 | Na₂CO₃ | CH₃CN | 82 | [(C₄H₉)₃PCH₂CH₂S-C₆H₅]⁺ I⁻ |
| LXX | LV | 0.8 | (CH₃)₂C₆H₃-SH | 1.0 | Na₂CO₃ | THF | 70 | [(4-Cl-C₆H₄)₃PCH₂CH₂S-C₆H₃(CH₃)₂]⁺ Cl⁻ |
| LXXI | XXXVII | 1.0 | thiazoline-CSH | 4.0 | (CH₃)₃N | Diglyme | 50 | [(tolyl)₃PCH₂CS-thiazoline]⁺ Cl⁻ |
| LXXII | LVII | 1.7 | benzoxazole-CSH | 1.0 | (C₂H₅)₄NOH | DMF | 10 | [(CH₃)₃PCH₂CS-benzoxazole]⁺ Br⁻ |
| LXXIII | XXXIX | 2.0 | C₂H₅(CH₃)C-thiazoline-CSH | 1.0 | Activated alumina | DME | 21 | [(C₄H₉)₃PCH₂CS-thiazoline(C₂H₅)(CH₃)]⁺ Cl⁻ |
| LXXIV | LIX | 1.0 | (C₄H₉)₂P(S)SH | 3.5 | Activated alumina | DME | 90 | [((C₄H₉)₃PCH₂CH₂SP(C₄H₉)₂)=S]⁺ Cl⁻ |
| LXXV | XXXIV | 1.0 | (C₂H₅O)₂P(S)SH | 2.0 | MgCO₃ | Dioxane | 70 | [(C₆H₅)₃PCH₂CH₂SP(OC₂H₅)₂=S]⁺ I⁻ |

Example LXXVI

Potassium O,O-diethylphosphorodithiolate (13.0 grams, 0.06 mole) is dissolved in 50 milliliters of acetone and added dropwise to a stirred solution of tributylvinylphosphonium bromide (15.4 grams, 0.05 mole) in 50 milliliters of acetone. After standing overnight at room temperature, the mixture is filtered to remove precipitated potassium bromide and the acetone filtrate is treated with 10 milliliters of 10% hydrobromic acid. Upon treating the resulting mixture with diethyl ether the product phosphonium salt

is obtained in nearly quantitative yield as a viscous syrup.

Obviously, from Table F, G, H, the symbols $R^1$, $R^2$, $R^3$, Y and X have the meanings given hereinabove in corresponding Equations A, B, C, D and E. The remaining symbols in Equations F, G and H of Table F, G, H have the following meanings:

R represents alkyl or alkylene having from 1 to 12 carbon atoms; benzyl; trialkylsilyl methylene in which the alkyl moiety has from 1 to 8 carbon atoms; benzene; toluene; xylene; and 2-naphthylene.

$n$ is selected from 1 and 2.

A and A' each represent lower alkyl and lower alkoxy.

Q and Q' each represent H, lower alkyl, or, when taken together, the residue of the phenyl radical.

Z represents S or O.

As is evident from Table F, G, H, above, the reactions contemplated therein using 2-acetoxyethylphosphonium salts as reactants are carried out in the presence of a base of the type illustrated hereinabove for Equation C. By the same token, the vinylphosphonium salt reactants of Equations F, G and H, respectively, of Table F, G, H may be reacted as shown in said table using or omitting a base. Furthermore, the solvents of Equation C, supra, are contemplated for the reactions of Equations F, G and H, as well as atmospheric, sub-atmospheric and super-atmospheric conditions. Similarly, an excess of either reactant with respect to the other is contemplated, although stoichiometric amounts are generally employed. It will be noted from Table F, G, H (cf. particularly Example LXXI) that tertiary alkyl (lower) amines are likewise contemplated as bases. The amount of base used in the examples of Table F, G, H is 1 percent, based upon the total weight of reactants (1) and (2). Generally, from about .01 percent to about 10 percent may be used.

The products of Equations F, G, H are useful as fire retardants in plastics in the same manner described hereinabove for the products Equations A, B, C and D.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method which comprises bringing into reactive contact a phosphonium salt of the formula

with a sulfhydryl of the formula $$R(SH)_n$$

in the presence of an inert organic solvent and recovering the corresponding salt of the formula

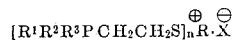

$R^1$, $R^2$, and $R^3$ in the above formulae each represent a member selected from the group consisting of alkyl $C_1$–$C_{16}$, substituted alkyl $C_1$–$C_{16}$, cycloalkyl, phenyl, substituted phenyl, and naphthyl, said substituents for alkyl being selected from the group consisting of lower alkoxy and cyano and said substituents for phenyl being selected from the group consisting of lower alkyl and halogen;

X represents halogen;

R represents a member selected from the group consisting of alkyl having from 1 to 12 carbon atoms, alkylene having from 1 to 12 carbon atoms, benzyl, trialkylsilyl methylene in which the alkyl moiety has from 1 to 8 carbon atoms, benzene, toluene, xylene, and 2-naphthylene;

$n$ is selected from 1 and 2.

2. The method of claim 1 in which the phosphonium salt reactant of claim 1 is prepared by the in situ reaction of a precursor phosphonium salt of the formula

with a base, wherein $R^1$, $R^2$, $R^3$, R and X have the same meaning as in claim 1 and Y represents the residue of an acylating agent.

References Cited by the Examiner

Laible, R. C., Chemical Abstracts, 53, 1959, page 19975h, QD1.A51.

Marsi, Kenneth L., Chemical Abstracts, 55, 1961 page 23400C, QD1.A51.

TOBIAS E. LEVOW, *Primary Examiner.*

NICHOLAS S. RIZZO, A. D. ROLLINS, W. F. W. BELLAMY, *Assistant Examiners.*